(12) United States Patent
Gaude (10) Patent No.: US 9,147,012 B2
(45) Date of Patent: Sep. 29, 2015

(54) USER REQUEST BASED CONTENT RANKING

(75) Inventor: Nicolas Gaude, Issy les Moulineaux (FR)

(73) Assignee: Cisco Technology Inc., San Jose, CA (US)

(*) Notice: Subject to any disclaimer, the term of this patent is extended or adjusted under 35 U.S.C. 154(b) by 0 days.

(21) Appl. No.: 13/503,479

(22) PCT Filed: Oct. 18, 2010

(86) PCT No.: PCT/IB2010/054700
§ 371 (c)(1),
(2), (4) Date: Jul. 10, 2012

(87) PCT Pub. No.: WO2011/055256
PCT Pub. Date: May 12, 2011

(65) Prior Publication Data
US 2012/0271835 A1    Oct. 25, 2012

(30) Foreign Application Priority Data
Nov. 4, 2009 (GB) .................................. 0919273.3

(51) Int. Cl.
*G06F 7/00* (2006.01)
*G06F 17/30* (2006.01)
*G06F 17/00* (2006.01)

(52) U.S. Cl.
CPC .... *G06F 17/30994* (2013.01); *G06F 17/30867* (2013.01); *G06F 2216/03* (2013.01)

(58) Field of Classification Search
CPC ..................... G06F 17/30994; G06F 17/30867
USPC .................................................. 707/748, 752
See application file for complete search history.

(56) References Cited

U.S. PATENT DOCUMENTS

| 5,778,362 A | 7/1998 | Deerwester |
| 5,987,470 A | 11/1999 | Meyers et al. |

(Continued)

FOREIGN PATENT DOCUMENTS

| EP | 1 400 903 A1 | 3/2004 |
| EP | 1 424 640 A2 | 6/2004 |

(Continued)

OTHER PUBLICATIONS

Ricardo Fabbri et al., "2D Euclidean Distance Transform Algorithms: A Comparative Survey", ACM Computing Surveys, vol. 40, No. 1, Article 2, Publication Date: Feb. 2008.*

(Continued)

*Primary Examiner* — Kannan Shanmugasundaram
(74) *Attorney, Agent, or Firm* — Hahn Loeser & Parks LLP (57) ABSTRACT

A content recommendation method and system including providing a plurality of content items, the number of items designated as N, representing each of the N content items symbolically represented as a unique point on a two-dimensional plane, thereby associating an x and y coordinate with each one of the content items, changing the x and y coordinate of the unique point based on user requests for other content items besides the one of the N content items, determining a distance between the unique point and a multiplicity of points corresponding to a multiplicity of other content items, returning at least a first content recommendation to a user, the at least a first content recommendation including a content item associated with a point closer than any other point to a point associated with the content item presently being viewed by the user. Related methods and apparatus are also described.

2 Claims, 8 Drawing Sheets

(56) References Cited

U.S. PATENT DOCUMENTS

| | | | |
|---|---|---|---|
| 6,295,514 B1 * | 9/2001 | Agrafiotis et al. | 703/12 |
| 6,389,418 B1 | 5/2002 | Boyack et al. | |
| 2002/0198882 A1 | 12/2002 | Linden et al. | |
| 2003/0233655 A1 | 12/2003 | Gutta et al. | |
| 2004/0003401 A1 | 1/2004 | Gutta et al. | |
| 2004/0098744 A1 | 5/2004 | Gutta | |
| 2005/0071465 A1 | 3/2005 | Zeng et al. | |
| 2007/0255707 A1 | 11/2007 | Tresser et al. | |
| 2009/0300004 A1 * | 12/2009 | Tokashiki et al. | 707/5 |
| 2010/0250336 A1 * | 9/2010 | Selinger et al. | 705/10 |

FOREIGN PATENT DOCUMENTS

| | | |
|---|---|---|
| EP | 1 494 144 A2 | 1/2005 |
| EP | 1 538 838 A1 | 6/2005 |
| EP | 1 906 317 A2 | 4/2008 |
| WO | WO 00/17793 | 3/2000 |
| WO | WO 02/25938 A2 | 3/2002 |
| WO | WO 2004/047446 A1 | 6/2004 |
| WO | WO 2007/026357 A2 | 3/2007 |
| WO | WO 2008/051882 A2 | 5/2008 |
| WO | WO 2008/102331 A2 | 8/2008 |

OTHER PUBLICATIONS

International Search Report and Written Opinion for PCT Application No. PCT/IB2010/054700 dated Mar. 21, 2012 (18 pages).

European Patent Office communication for PCT Application No. PCT/IB2010/054700 dated Jan. 21, 2011 (7 pages).

Jun. 25, 2014 Office Communication in connection with prosecution of EP 10 775 904.5.

* cited by examiner

USER REQUEST BASED CONTENT RANKING

CROSS REFERENCE TO RELATED APPLICATIONS

The present application is a 35 USC §371 application of PCT/IB2010/054700, filed on Oct. 18, 2010 and entitled "USER REQUEST BASED CONTENT RANKING", which was published in the English language with International Publication Number WO 2011/055256 A1, and which claims the priority of Great Britain Patent Application No. GB 0919273.3 of NDS Limited, filed Nov. 4, 2009, the content of all of which is incorporated herein by reference.

BACKGROUND OF THE INVENTION

The following patents and patent applications are believed to reflect the state of the art:

EP 1400903 of Sony United Kingdom Ltd.;
EP 1424640 of Sony United Kingdom Ltd.;
EP 1494144 of Sony United Kingdom Ltd.;
EP 1538838 of Sony Corp.;
EP 1906317 of Sony United Kingdom Ltd.;
U.S. Pat. No. 5,778,362 to Deerwester;
US 2003/0233566 of Gutta, et al.;
US 2004/0003401 of Gutta, et al.;
WO 02/25938 of Koninklijke Philips Electronics N.V.;
WO 2004/047446 of Koninklijke Philips Electronics N.V.;
WO 2007/026357 of NDS Ltd.;
WO 2008/102331 of NDS Ltd.; and
WO 2008/051882 of Music-Strands, Inc.

SUMMARY OF THE INVENTION

There is thus provided in accordance with an embodiment of the present invention a content recommendation method including providing a plurality of content items, a number of items including the plurality of content items designated as N, symbolically representing each of the N content items as a unique point on a two-dimensional plane, thereby associating an x and y coordinate with each one of the content items, associating, as an initial condition, a weight of zero with each point on the two-dimensional plane, incrementing the weight associated with the unique point associated with one of the N content items each time the one of the N content items is accessed, changing the x and y coordinate of the unique point based on a plurality of user requests for other content items besides the one of the N content items, determining a distance between the unique point and a multiplicity of points corresponding to a multiplicity of other content items, returning at least a first content recommendation to a user, the at least a first content recommendation including a content item associated with a point closer than any other point to a point associated with the content item presently being viewed by the user.

Further in accordance with an embodiment of the present invention upon selection of one of the N content items by the user, calculating a new x and y coordinate for the unique point associated with the one of the N content items selected by the user.

Still further in accordance with an embodiment of the present invention upon selection of a content item by the user, calculating a new x and y coordinate for the unique point associated with a previous content item viewed by the user.

Additionally in accordance with an embodiment of the present invention calculating the distance between the x and y coordinate of the unique point associated with the one of the N content items selected by the user and the new location of the unique point associated with the previous content item viewed by the user.

Moreover in accordance with an embodiment of the present invention the calculating the distance includes evaluating, from a first vector, denoted $\vec{rIM}(c)$ $\vec{rIM}(c)$, and a and a second vector, denoted $\vec{rIM}(l)$ the first vector including the x and y coordinates and the weight (w) associated with a user currently viewed content item (c), and the second vector including the x and y coordinates and the weight (w) associated with a user last viewed content item (l), such that $$\vec{rIM}(a) = \begin{bmatrix} xa \\ ya \\ wa \end{bmatrix}$$

$$\vec{rIM}(c) = \begin{bmatrix} xc \\ yc \\ wc \end{bmatrix} \text{ and } \vec{rIM}(l) = \begin{bmatrix} xl \\ yl \\ wl \end{bmatrix} \left|\vec{rIM}(l)\right| = \begin{bmatrix} xl \\ yl \\ wl \end{bmatrix},$$

determining a barycenter $\vec{rIM}(g)$ such that $$\vec{rIM}(g) = \frac{wl * \vec{rIM}(c) + wc * \vec{rIM}(l)}{wl + wc} = \begin{bmatrix} xg \\ yg \\ wg \end{bmatrix}$$

determining an elasticity factor, denoted k, updating $\vec{rIM}(c)$ and $\vec{rIM}(l)$ as follows $$\vec{rIM}(c) = \begin{bmatrix} xc + k(xg - xc) \\ yc + k(yg - yc) \\ wc + 1 \end{bmatrix} \text{ and } \vec{rIM}(l) = \begin{bmatrix} xl + k(xg - xl) \\ yl + k(yg - yl) \\ wl + 1 \end{bmatrix}$$

determining the distance between two points, a and b, corresponding to two content items as follows given $$\vec{rIM}(a) = \begin{bmatrix} xa \\ ya \\ wa \end{bmatrix} \text{ and } \vec{rIM}(b) = \begin{bmatrix} xb \\ yb \\ wb \end{bmatrix}$$

then distance$(a,b) = \sqrt{(xa-xb)^2 + (ya-yb)^2}$.

Further in accordance with an embodiment of the present invention the elasticity factor, k is equal to 1 (one) if, after a content request, the distance between the two points a and b has changed, and otherwise, if the distance between two points a and b has not changed, k is equal to 0 (zero).

Still further in accordance with an embodiment of the present invention the method is performed independently for each one of a plurality of given defined groups, and the incrementing step is performed for a defined group only when a member of the defined group accesses the one of the N content items.

There is also provided in accordance with another embodiment of the present invention a content recommendation method including providing a plurality of content items, a number of items including the plurality of content items designated as N, listing the content items in a content catalog, assigning a uniform resource identifier (URI) to each content item of the plurality of content items available in the content catalog, establishing an N×N matrix, the matrix designated IM, each element of the matrix associated with coordinates IM(n,m), such that IM(n,m) includes a total number of requests for a content item assigned to a URI m from a user who last requested a content item assigned to a URI n, adding the N×N matrix, IM, with its transpose matrix, $IM^T$, thereby determining matrix $sIM=IM+IM^T$ determining which content item a user is presently viewing, retrieving a column vector from matrix sIM, the column vector corresponding to the content item presently being viewed by the user, sorting the values of the elements in the retrieved column vector from greatest value to least value, and returning at least a first content recommendation to the user, such that the content item corresponding to the URI corresponding to the matrix element from matrix sIM including the greatest value in the retrieved column vector includes the first recommendation.

There is also provided in accordance with still another embodiment of the present invention a content recommendation system including a plurality of content items, a number of items including the plurality of content items designated as N, a content catalog including a list of the content items, a uniform resource identifier (URI) assigned to each content item of the plurality of content items available in the content catalog, an N×N matrix, the matrix designated IM, each element of the matrix associated with coordinates IM(n,m), such that IM(n,m) includes a total number of requests for a content item assigned to a URI m from a user who last requested a content item assigned to a URI n, a content ranking system which adds the N×N matrix, IM, with its transpose matrix, $IM^T$, thereby determining matrix $sIM=IM+IM^T$ determines which content item a user is presently viewing, retrieves a column vector from matrix sIM, the column vector corresponding to the content item presently being viewed by the user, sorts the values of the elements in the retrieved column vector from greatest value to least value, and returns at least a first content recommendation to the user, such that the content item corresponding to the URI corresponding to the matrix element from matrix sIM including the greatest value in the retrieved column vector includes the first recommendation.

There is also provided in accordance with still another embodiment of the present invention a content recommendation system including a plurality of content items, a number of items including the plurality of content items designated as N, a content ranking system which symbolically represents each of the N content items as a unique point on a two-dimensional plane, thereby associating an x and y coordinate with each one of the content items, associates, as an initial condition, a weight of zero with each point on the two-dimensional plane, increments the weight associated with the unique point associated with one of the N content items each time the one of the N content items is accessed, changes the x and y coordinate of the unique point based on a plurality of user requests for other content items besides the one of the N content items, determines a distance between the unique point and a multiplicity of points corresponding to a multiplicity of other content items, returns at least a first content recommendation to a user, the at least a first content recommendation including a content item associated with a point closer than any other point to a point associated with the content item presently being viewed by the user.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
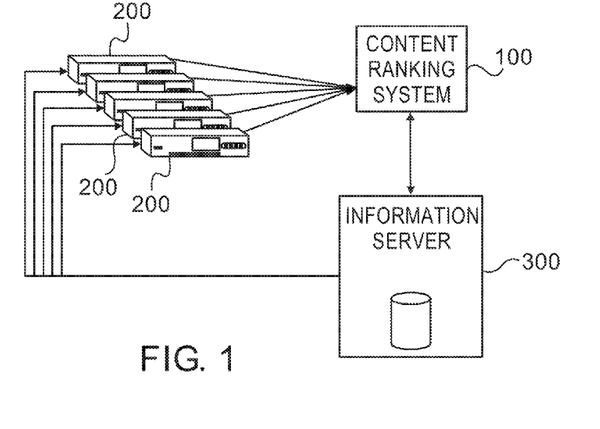
FIG. 1 is a simplified illustration of a user request based content ranking system constructed and operative in accordance with an embodiment of the present invention.

Reference is now made to FIG. 1, which is a simplified illustration of a user request based content ranking system 100 constructed and operative in accordance with an embodiment of the present invention.

Each time a user selects one content item, the user's set top box 200 notifies the user request based content ranking system 100. The user request based content ranking system 100 determines which user from among a plurality of users which are having their content requests ranked issued the user request. Using methods described below, the user request based content ranking system 100 updates rankings of content based on the user request. The user request based content ranking system 100 send the resulting updated ranking information to an information server 300. The information server 300 then sends the ranking information to at least the user's set top box 200. The ranking information is then used by the set top box 200 to present the results, in the form of viewing recommendations, to the user.

The method by which the user request based content ranking system 100 updates rankings of content based on the user request is now described. In formulating the method by which the user request based content ranking system 100 updates rankings of content based on the user request, it is assumed that a single content provider is utilized as a primary content provider. Each user is provided with a unique user identifier which is sent to the content provider along with any user requests for content so that the content provider can distinguish any user accessing its content catalog from any other user accessing its content catalog. Additionally, each content item in the content provider's content catalog comprises a uniform resource identifier (URI).

The content provider head-end delivers the URI of content in the content catalog of the content provider to each user. Each user initiated content request therefore includes the URI of the requested content as well as the user identifier.

As a consequence of all of the above, it follows that the provider is aware of each request for content access made by each specific user. To avoid user privacy violation, any logging system maintained by the content provider will not store the user specific overall history but will only maintain for each user-request a one depth URI history.

Accordingly, when an individual user requests content within the content provider content catalog, a user-history log is therefore capable of providing the following doublet of information:

the URI of the current content requested; and the URI of the last content requested (if any).

For example and without limiting the generality of the foregoing, consider the following scenario, where there are:

3 users, designated user1, user2, and user3; and 3 content items, designated URI1, URI2, and URI3.

The following sequence of user requests make up the example scenario:

a. user1 requests content item URI1 b. user2 requests content item URI1 c. user3 requests content item URI2 d. user2 requests content item URI2 e. user1 requests content item URI3 f. user3 requests content item URI1 g. user1 request content item URI2 h. user3 requests content item URI2

Given the sequence of user requests for content in steps a-h above, the user-history-backlog will maintain the following information at each step of the sequence:

| Backlog | Steps | | | | | | | |
|---|---|---|---|---|---|---|---|---|
| | a. | b. | c. | d. | e. | f. | g. | h. |
| User1 last URI | — | — | — | — | URI1 | URI1 | URI3 | URI3 |
| User1 current URI | URI1 | URI1 | URI1 | URI1 | URI3 | URI3 | URI2 | URI2 |
| User2 last URI | — | — | — | URI1 | URI1 | URI1 | URI1 | URI1 |
| User2 current URI | — | URI1 | URI1 | URI2 | URI2 | URI2 | URI2 | URI2 |
| User3 last URI | — | — | — | — | — | URI2 | URI2 | URI1 |
| User3 current URI | — | — | URI2 | URI2 | URI2 | URI1 | URI1 | URI2 |

A matrix, hereinafter designated IM (as in "Ideal-oriented-link-Matrix"), reflecting user requests, such as those in the example above, can be constructed as described below. Utilizing the resulting matrix, the user request based content ranking system 100 is able to predict and then recommend content items of interest to users. As will be explained in detail below, a recommendation will be based, at least in part, on a calculation of the distance between two content items requested: a current content item and a previous content item.

Given a plurality of content items, a number of items comprising the plurality of content items designated as N, an ideal-matrix is a N×N matrix composed of IM(n,m) elements where n,m are the coordinates of elements in the IM matrix. For the purpose of the present invention, IM(n,m) is the total number of requests for a content item having URI "m" from a user which last request was for a content item having URI "n".

For example and without limiting the generality of the foregoing, continuing with the previous example, since there are three content items (URI1, URI2, and URI3), IM(n,m) is a 3×3 matrix. A coefficient, IM(uri#N,uri#M) is the number of times a user has requested content item "uri#M" for which the last requested content item was 'uri#N". Thus, following steps a-h above, the following steps are taken to populate IM:

a-c. $IM = \begin{bmatrix} 0 & 0 & 0 \\ 0 & 0 & 0 \\ 0 & 0 & 0 \end{bmatrix}$ every user's history begins empty.

d. $IM = \begin{bmatrix} 0 & 0 & 0 \\ 1 & 0 & 0 \\ 0 & 0 & 0 \end{bmatrix}$ user2 goes from URI1 to URI2.

e. $IM = \begin{bmatrix} 0 & 0 & 0 \\ 1 & 0 & 0 \\ 1 & 0 & 0 \end{bmatrix}$ user1 goes from URI1 to URI3.

f. $IM = \begin{bmatrix} 0 & 1 & 0 \\ 1 & 0 & 0 \\ 1 & 0 & 0 \end{bmatrix}$ user3 goes from URI2 to URI1.

g. $IM = \begin{bmatrix} 0 & 1 & 0 \\ 1 & 0 & 1 \\ 1 & 0 & 0 \end{bmatrix}$ user1 goes from URI3 to URI2.

h. $IM = \begin{bmatrix} 0 & 1 & 0 \\ 2 & 0 & 1 \\ 1 & 0 & 0 \end{bmatrix}$ user3 goes from URI1 to URI2.

The IM matrix has the following properties:

The IM matrix has, by design, a null-diagonal;

Each coefficient of the #$N^{th}$ column-vector of IM matrix is the distance from content URI#N to another content item; and equivalently Each coefficient of the #$N^{th}$ row-vector of IM matrix is the distance to content URI#N from another content item.

To ease the result interpretation, a non-oriented version of the IM matrix is defined, as described below. Those skilled in the art will appreciate that in a non-oriented matrix, going from URIn to URIp is equivalent to going from URIp to URIn.

A matrix, denoted sIM is the link matrix considered to be a request from content A to content B and is equivalent to a request from content B to content A. This particular matrix, noted sIM, is the symmetric version of IM matrix:

$$sIM = IM + IM^T$$

In the above example:

$$sIM = \begin{bmatrix} 0 & 3 & 1 \\ 3 & 0 & 1 \\ 1 & 1 & 0 \end{bmatrix}$$

A column-vector of the sIM matrix expresses the distances relationship between the current content item and all other content items. Those skilled in the art will appreciate that any real-coefficient symmetric matrix M is invertible such that M multiplied by the inverse of matrix M equals I, where I is the matrix identity. Thus, sIM, as a symmetric matrix, can be inverted. Since sIM is invertible, the set of vectors which comprise sIM is a "basis". Thus, given any vector in the vector space of sIM, that vector can be decomposed into a linear combination of the vectors of the basis. Thus, given that any column of sIM is a vector of content and URIs which comprises a coefficient representing the distance from the present content item to another content item; and the set of vectors of sIM is a basis. It follows that any content item (URI) can be decomposed into a linear combination of other content items (URIs), regardless of the distance of one content item to any other content items.

High coefficients in the column-vector indicate the most popular content items (i.e. the closest) requested from the content item. For instance, continuing to use the above example, after step h, all of the users will have requested content item URI2. Accordingly, the user request based content ranking system 100 will evaluate the second column-vector of the sIM matrix to determine the popularity of other content items which have been requested after a user views content item URI2:

$$sIM(uri2) = \begin{bmatrix} 3 \\ 0 \\ 1 \end{bmatrix}$$

Thus, a user who has viewed content item URI2 will receive from the user request based content ranking system 100 a recommendation to first view content item URI1 (with a rank of 3), and then a recommendation to view content item URI3 (with a rank of 1). Note that URI2 has a rank of 0, since no requests are received to change from URI2 to URI2.

Thus, given the user-history backlog, the user request based content ranking system 100 retrieves the user_current_content for a specific user. The user request based content ranking system 100 then retrieves the column-vector corresponding to the user_current_content from the IM matrix (or from the corresponding sIM matrix). The user request based content ranking system 100 sorts the coefficients in the retrieved column-vector in order to determine a maximum ranking. The user request based content ranking system 100 then proposes to the user a sorted list of ranked content items.

Figure 2:
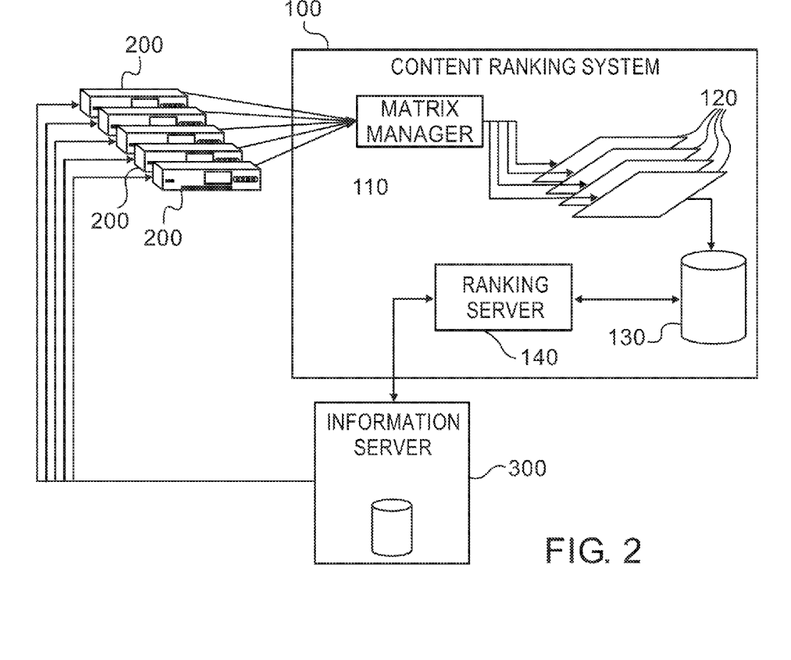
FIG. 2 is a simplified block diagram illustration of the system of FIG. 1 detailing the user request based content ranking system.

Reference is now made to FIG. 2, which is a simplified block diagram illustration of the system of FIG. 1 detailing the user request based content ranking system 100. Each time a user's set top box 200 sends a request to a particular content item to the user request based content ranking system 100, a matrix manager 110 determines which at least one of several matrices 120 require updating. A method described below for optimizing and generalizing the above method for creating the IM matrix is described below. The method for optimizing and generalizing describes, below, how and why there might be several matrices 120 requiring updating. The updated at least one of several matrices 120 is stored in a database 130.

A ranking server 140 implements a matrix resealing mechanism (described below) and provides the information server 300 with at least the following data:
- a list of available matrices comprising the at least one of several matrices 120;
- matrix information and details for each of the at least one of several matrices 120; and
- a list of events distances given a list of events comprised in the at least one of several matrices 120.

The method of constructing the IM matrix described above results in a very large matrix when there is a large amount of content available in the content provider's system. Thus, it is desirable to reduce the size of the IM matrix.

Furthermore, the IM matrix described above increases in size dramatically as each new content item is added. Additionally, for example and without limiting the generality of the foregoing, keeping track of 10,000 content items comprised in a content provider's catalog would involved a 10,000×10,000 IM matrix, and even after 1,000,000 user-requests within the system, this IM matrix will only have at least 1% of the coefficients of the IM matrix filled. This is due to the IM matrix being designed, as explained above, to construct a vector-bases generator in which all content items can be decomposed into a combination of other content items. Accordingly, it is an implicit assumption of the present invention that the real dimension of an N content item catalog expressed in the IM matrix is largely inferior to N dimension.

By way of explanation of the assumption that the real dimension of an N content item catalog expressed in the IM matrix is largely inferior to N dimension, it is appreciated that the more complex a matrix is, the richer the space generated by the matrix is. Therefore, given a matrix M, the sub-space generated by the matrix M is defined by the sub-space of the space that contains any vectors generated by M*V where M is the matrix and V is any given vector of the space. It follows that the sub-space is always included in the space, and thus, the rank of the matrix M, dim(M) is always less than N where N is the dimension of the space. For instance:

The identity matrix I is rich, because the identity matrix requires every vector of the basis to be generated (and thus, dim(I)=N); and Matrix M, for which any coefficient is equal to m is poor, because only one vector can generate M (dim(M)=1<<N).

An implicit assumption of any data clustering method, such as the clustering method comprising an embodiment of the present invention is that given similar content items, the matrix sIM that represents the clustered data will be self-similar. Therefore, in terms of the examples above, sIM will be poor, and thus, dim(sIM)<<N.

Therefore, it is possible to construct an embodiment of a matrix in which the size of the IM matrix can be drastically reduced. One such embodiment comprises a possible reduction of the initial IM (N×N) matrix to a reduced rIM(N×3) matrix.

Let each of the N content items of the catalog be represented as a point on a two-dimensional plane and associate a weight to each point of the plane. The weight associated with each point contains the number of time a specific point-associated content item is accessed. The system of the embodiment described now is initialized so that each content item of the catalog is assigned a random spatial position and a null-mass, i.e. the weight is equal to zero (or more specifically, there was no previous access of the content item). The initialization of the plane and the various points disposed thereon is depicted in FIG. 3, which is a depiction of an initialized normalized reduced matrix (rIM), showing positions for 10,000 content items to be ranked by the system of FIG. 1

The method described herein below automatically sorts the points associated with the N content items. Content items are then recommended to users in relation to a presently viewed content item.

Figure 3:
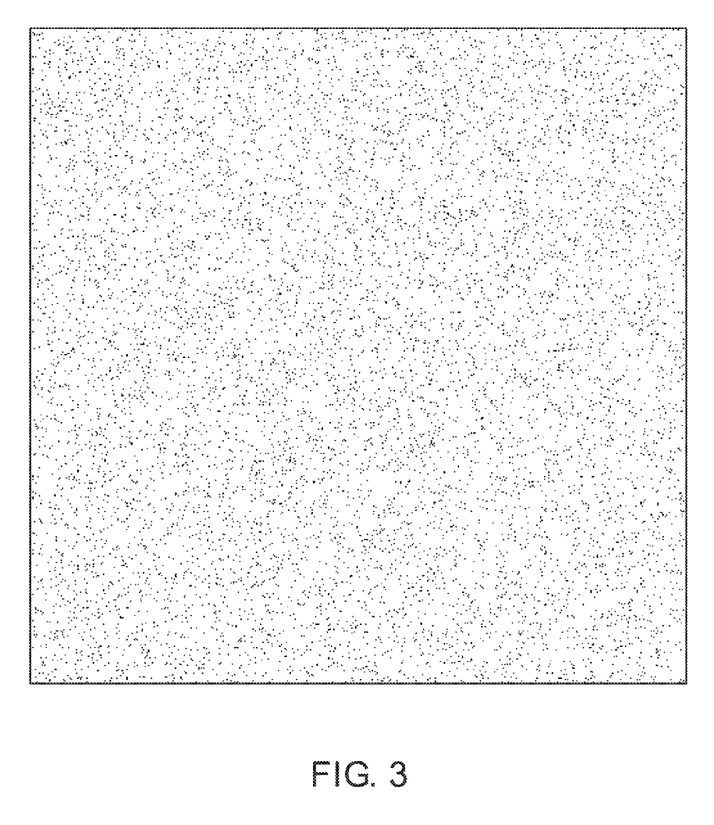
FIG. 3 is a depiction of an initialized normalized reduced matrix (rIM), showing positions for 10,000 content items to be ranked by the system of FIG. 1.

It can be readily appreciated in light of FIG. 3 that, at initialization and shortly thereafter, recommendations may not really be relevant since the content is not organized yet. Over time, the content items (and, correspondingly, points associated with the content items) will then be sorted in response to user navigation through the content catalog. As is seen below, the system will become more and more accurate (i.e. relevant) over time.

Continuing with the discussion of how content items and points associated with the content items can be sorted, for each user request for a content item, the user request based content ranking system 100 determines a barycenter of 2 content items: the previously viewed content item; and the presently viewed content item. Content item organization and the distribution of the points associated with the content items are then updated accordingly.

Specifically, each time a user requests a content item from the catalog of content items, the user history backlog returns for this specific user:
user_last_content; and
user_current_content.

Let $r\vec{IM}(c)$ denote a row vector for the user_current_content.

$$r\vec{IM}(c) = \begin{bmatrix} xc \\ yc \\ wc \end{bmatrix}$$

Where xc and yc correspond, respectively, to the x- and y-coordinates of the point associated with the user_current_content, and wc corresponds to the weight associated with the point associated with the user_current_content.

Similarly, let $r\vec{IM}(l)$ denote a row vector for the user_last_content:

$$r\vec{IM}(l) = \begin{bmatrix} xl \\ yl \\ wl \end{bmatrix}$$

Where xl and yl correspond, respectively, to the x- and y-coordinates of the point associated with the user_last_content, and wc corresponds to the weight associated with the point associated with the user_last_content.

Using $r\vec{IM}(c)$ and $r\vec{IM}(l)$, the barycenter $r\vec{IM}(g)$ of the user_current_content and the user_last_content is determined:

$$r\vec{IM}(g) = \frac{wl \cdot r\vec{IM}(l) + wc \cdot r\vec{IM}(l)}{wl + wc} = \begin{bmatrix} xg \\ yg \\ wg \end{bmatrix}$$

Where xg and yg correspond, respectively, to the x- and y-coordinates of the point associated with the barycenter $r\vec{IM}(g)$, and wg corresponds to the weight associated with the point associated with the barycenter $r\vec{IM}(g)$.

In order to add elasticity to the rIM update mechanism, a factor, k, in the range from [0, 1] is introduced, as follows:
if k=0 then the dipole last-current is not modified by the request; and
if k=1 then the dipole last-current is aggregated at its barycenter position.

Those skilled in the art will appreciate that the elasticity is the guarantee that similar content items will converge smoothly without aggregating to other content. For a large number of users, and a low value of k, the system will converge slowly. In order for the system to converge as quickly as possible, k should be set to 1 (one), thereby eliminating elasticity entirely.

The k elastic parameter fixes the responsiveness of the system all along the request. It is appreciated that the k elastic parameter can be a constant value or the k elastic parameter can be a function of wl, wc parameters.

The k elasticity factor depends upon the number of users of the catalog of content items. For a catalog with only a few users, it may be possible to increase the value of the k elasticity factor in order to increase the content aggregation and therefore increase more quickly the relevancy level of the recommendations.

Upon a user initiated content request starting from user_last_content to view user_current_content, the vector $r\vec{IM}(c)$ and $r\vec{IM}(l)$ are updated from the rIM matrix as follows:

$$r\vec{IM}(c) = \begin{bmatrix} xc + k(xg - xc) \\ yc + k(yg - yc) \\ wc + 1 \end{bmatrix} \text{ And } r\vec{IM}(l) = \begin{bmatrix} xl + k(xg - xl) \\ yl + k(yg - yl) \\ wl + 1 \end{bmatrix}$$

Figure 4:
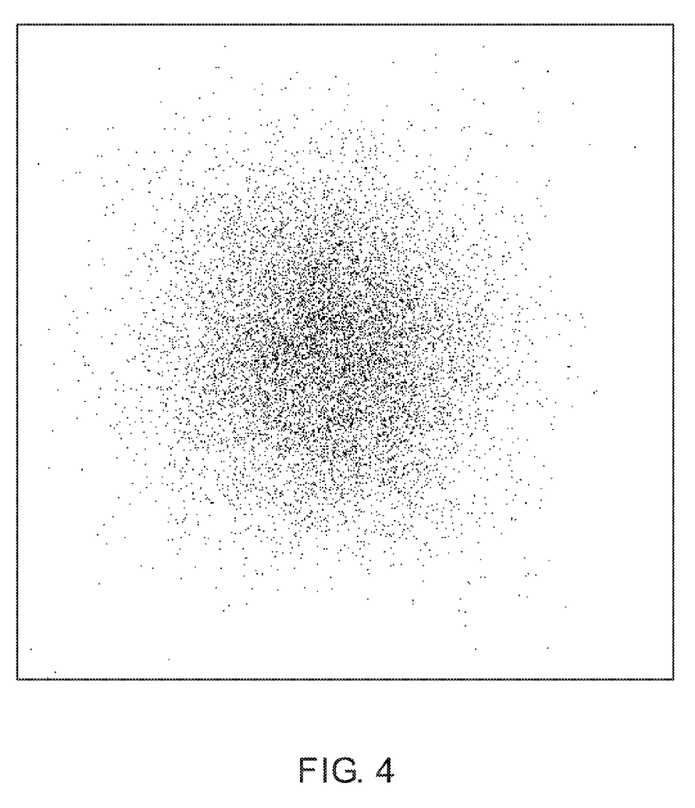
FIG. 4 is a depiction of the rIM matrix positions depicted in FIG. 3 after 200,000 content item requests.
Figure 5:
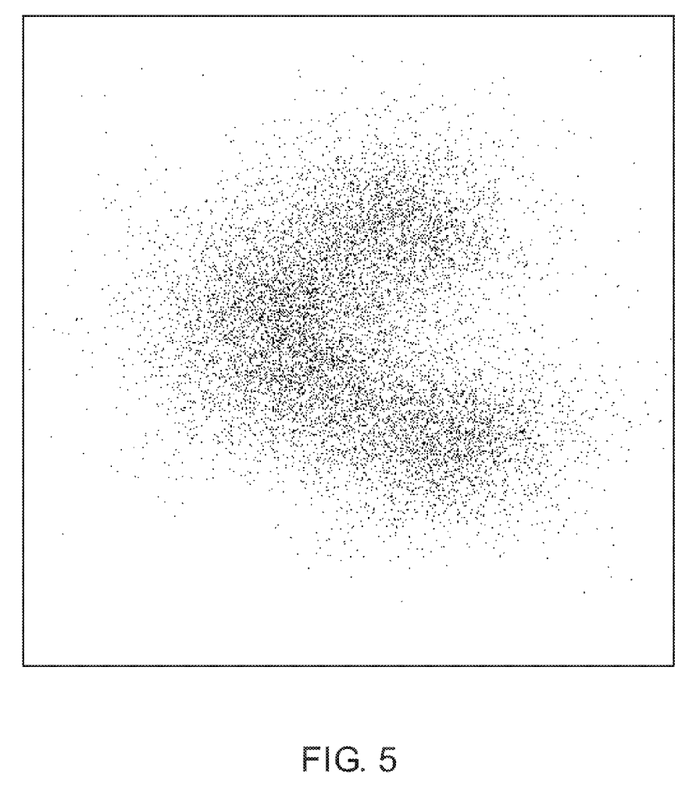
FIG. 5 is a depiction of the rIM matrix positions depicted in FIGS. 3 and 4 after 350,000 content item requests.
Figure 6:
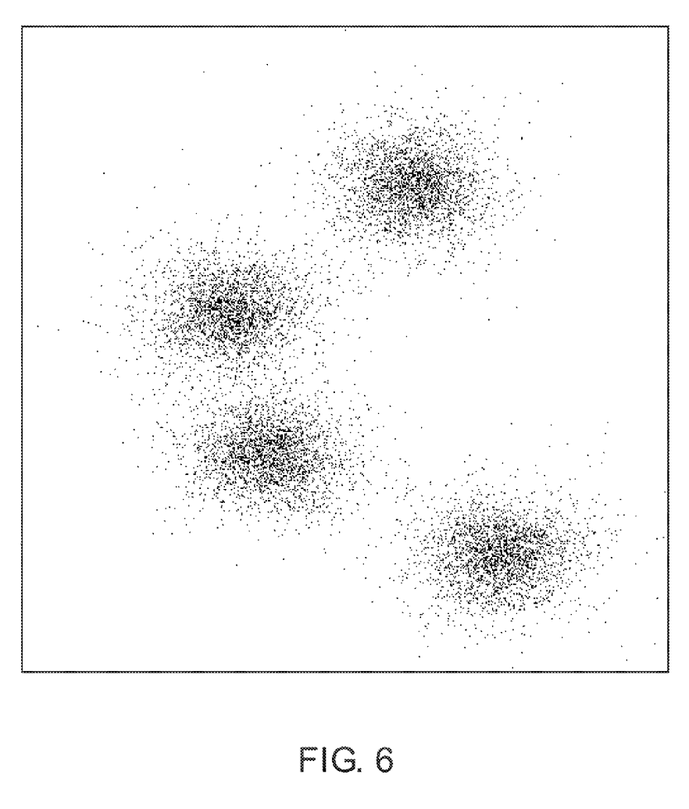
FIG. 6 is a depiction of the rIM matrix positions depicted in FIGS. 3-5 after 450,000 content item requests.
Figure 7:
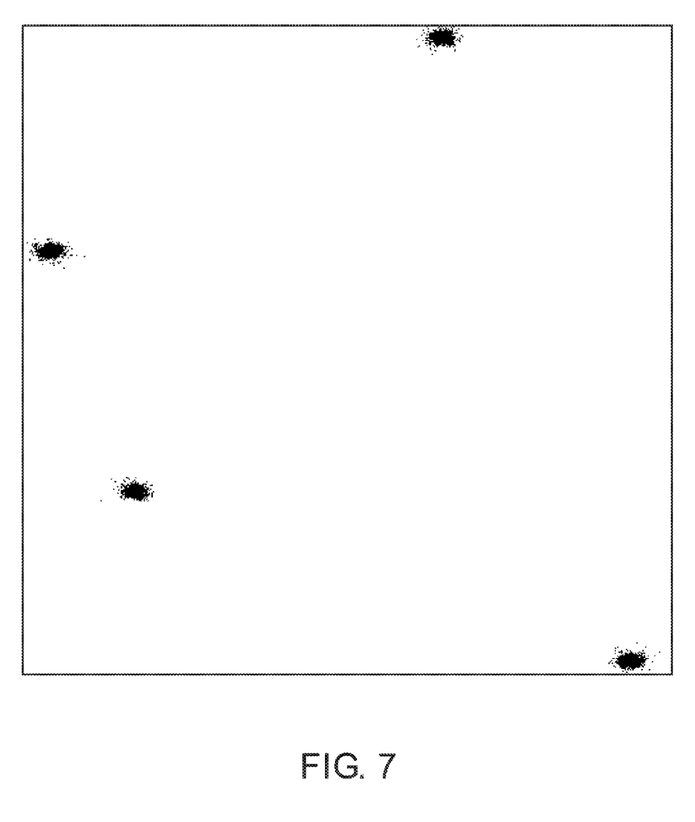
FIG. 7 is a depiction of the rIM matrix positions depicted in FIGS. 3-6 after 750,000 content item requests.

Accordingly, reference is now made to FIGS. 4-7. FIG. 4 is a depiction of the rIM matrix positions depicted in FIG. 3 after 200,000 content item requests. FIG. 5 is a depiction of the rIM matrix positions depicted in FIGS. 3 and 4 after 350,000 content item requests. FIG. 6 is a depiction of the rIM matrix positions depicted in FIGS. 3-5 after content item 450,000 requests. FIG. 7 is a depiction of the rIM matrix positions depicted in FIGS. 3-6 after content item 750,000 requests. In the depictions of the rIM matrix positions of FIGS. 4-7, the k elasticity factor was set to 10%.

In the example depicted in FIGS. 3-7, as noted above, for a catalog of 10,000 content items, approximately 1,000,000 user requests were randomly simulated. The user requests were simulated to center on content items which, broadly speaking, comprised four different thematic groups of content. The random simulation was developed so that fifty percent of the time a given user would not move away from whatever content item was already selected, and fifty percent of the time the user would move to a different content item.

It is appreciated that after 300,000 iterations (i.e. content requests, see FIG. 5), structure is appearing within the two-dimensional space representation of rIM matrix. Furthermore, after 450,000 iterations (i.e. content requests, see FIG. 6), a 4 group simulated structure is appearing in the rIM matrix. Additionally, after 750,000 iterations (i.e. content requests, see FIG. 7), the 4 main simulated groups get concentrated. It is appreciated that if there were other sub-fine-structures within the content item catalog, those sub-fine-structures would also appear progressively.

Once the points disposed in the two dimensional plane reach a fairly stable position, such as the position depicted in FIG. 7, user request based content ranking system 100 calculates the new distance between the 2 content items, user_last_content and user_current_content.

From the rIM matrix N×3 a classic spatial norm can be constructed between points associated with each content item. In line with the notation above, then:
Given $$r\vec{IM}(a) = \begin{bmatrix} xa \\ ya \\ wa \end{bmatrix} \text{ and } r\vec{IM}(b) = \begin{bmatrix} xb \\ yb \\ wb \end{bmatrix},$$

then distance(a,b)=$\sqrt{(xa-xb)^2+(ya-yb)^2}$

It is appreciated that the dimension reduction approach described above achieves the following:

memory consumption is reduced from $o(n^2)$ to $o(n)$;

insertion of a request in a link matrix complexity order is $o(1)$; and using BSP-tree (binary space partitioning), calculation of closest neighbors is $o(n*\log(n))$.

Once the user has selected one content item, content recommendation then proceeds as follows:

1. Update the content organization (perform a new barycenter calculation and determine the distance between the current and last content) as explained above; and 2. Recommend contents items based on the (closest) distance calculation: distance(a,b).

One consequence of the mass accumulation of every user's request into the matrix position over numerous iterations is a kind of gravitation collapse of the content around the system barycenter. The collapse is mostly due to the fact every user request tends to bring closer the elements of the dipole user_current_content and user_last_content. Those skilled in the art will appreciate that the collapse is a consequence of the so called long-tail effect, whereby, 90% of requested content items comprise only 10% of available content, for instance. Thus, in a system driven by actual (human) user requests, less requested content will tend to be negated. Consequently, more frequently requested content will tend to cluster. If we consider the series of requests which is composed by both structured search-path (for example and without limiting the generality of the foregoing, channel surfing from one sporting event to a second sporting event) and random search-path (for example and without limiting the generality of the foregoing, channel surfing from a sporting event to a cooking show), the overall system will then collapse into a spatial singularity after a given number of random search-path.

From an implementation point of view, a singularity will lead content coordinates to be very close and the distances between the points comprising the singularity approach zero. Depending on the implementation floating point resolution, rounding artifacts might occur.

To prevent formation of a singularity, a strategy which the inventors of the present invention have found promising has been to renormalize the rIM matrix coordinates to fit a unitary N-sphere object.

For example, and without limiting the generality of the foregoing, consider an N-dimensional rIM matrix after a large number of iterations. Such a rIM matrix has a G system-barycenter rIM(G). Additionally, for every I content item distance $d(rIM(I), rIM(G)) < \epsilon$.

The resealing mechanism described above will perform a homothetic transform centered on the G system barycenter with a scaling factor of $1/\epsilon$ such as for each I content item:

distance $d(rIM(I), rIM(G)) < 1$

Any individual content item, therefore, must be requested a certain minimum number of times in order to be clustered. For example and without limiting the generality of the foregoing, a content item which is, in an extreme case, never requested or accessed has no reason to be clustered into a larger cluster of content items. Accordingly, any content item must pass a certain threshold number of requests, in order to be clustered. Such a requirement is referred to as 'marginal requested content'. To cope with marginal requested content, the system might compute $\epsilon$ such that the previous condition is true for almost every content item.

Those skilled in the art will appreciate that from a geometric point of view $\epsilon$ is considered the horizon of the system singularity.

It is appreciated that a never-ending collection of user's request into the user request based content ranking system 100 leads to an infinite memorization process. In some cases the implementation shall take into account the topical nature of user's request. For example and without limiting the generality of the foregoing, some requests are for 'topical' or 'fashionable' items (for instance, requests for Michael Jackson would spike around the time of Jackson's demise. A week after Jackson's demise, the number of requests for content items associated with Michael Jackson would dramatically drop). This fashion artifact might introduce sediment into the user request based content ranking system 100 memory; no-longer-relevant association between content might still be stored. Accordingly, to counter the never ending increase of content weight, the weight parameter might be defined as:

The number of time a specific content is accessed over a specific period.

For example and without limiting the generality of the foregoing, a solution to the weight problem described above could be implemented easily with an array of weight[1 . . . n]:

the weight of a content item is the sum of all its weight[1 . . . n] during the T period;

each weight[i] is the number of time a specific content item has been accessed during one I sub-period; and the number n is defined as being the number of I sub-period in the T period: nI=T.

The solution proposed above solves the problem of outdated affinity between content. The related weight of outdated association is deprecated by the system over a T period of time.

In some implementations of the present invention the user request based content ranking system 100 associates a profile of attributes to each user of the content catalog. For example and without limiting the generality of the foregoing, a first user profile might have YOUNG and MAN attributes, when a second user profile might have SENIOR and WOMAN attributes.

To encompass the group aspect, some implementations of the present invention comprise several defined rIM( ) matrices, where each matches a given defined group. For example and without limiting the generality of the foregoing, a first rIM( ) matrix comprises a matrix for the senior group: rIM (SENIOR). A second rIM( ) matrix comprises a matrix for the woman or young user's group is rIM(WOMAN||YOUNG). The implementation of rIM(WOMAN||YOUNG) matrix takes into account every request to the system from users that are associated with a user profile having the WOMAN attribute or from users that are associated with a user profile having the YOUNG attribute. For a given user belonging to n groups, the user request based content ranking system 100 will reference related content items from each corresponding rIM(1) . . . rIM(n) matrix.

Figure 8:
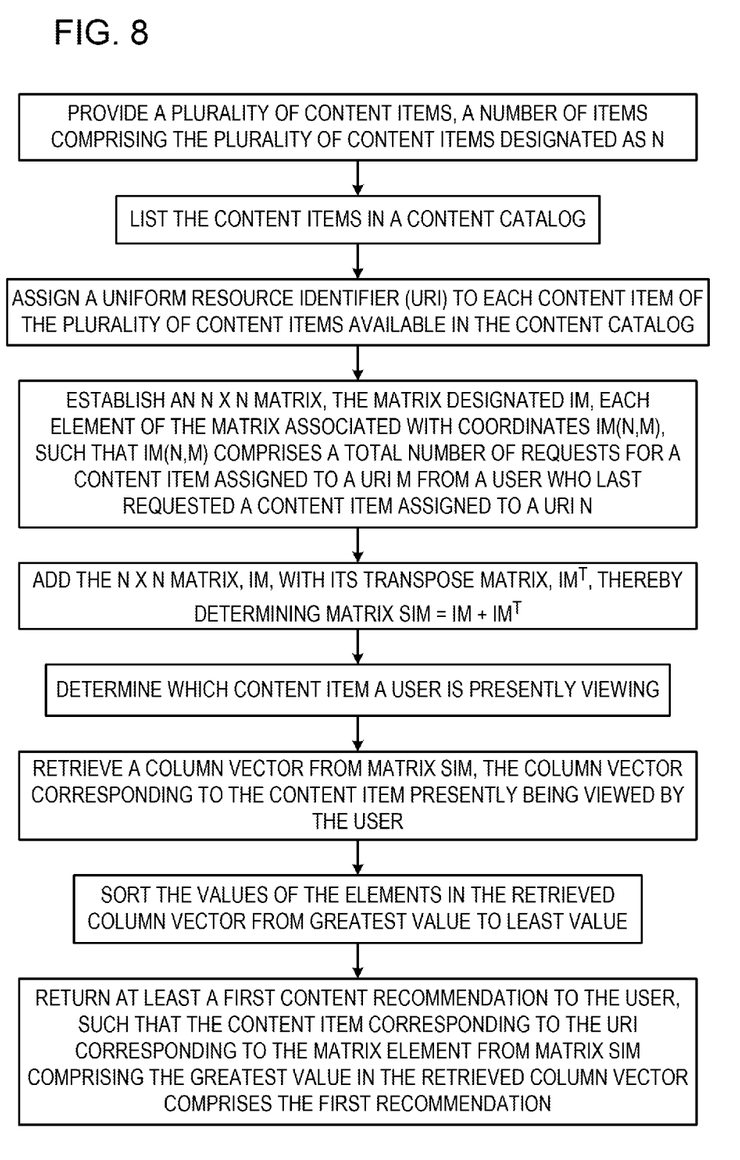
FIGS. 8 and 9 are simplified flowcharts of certain methods of operation of the system of FIG. 1.
Figure 9:
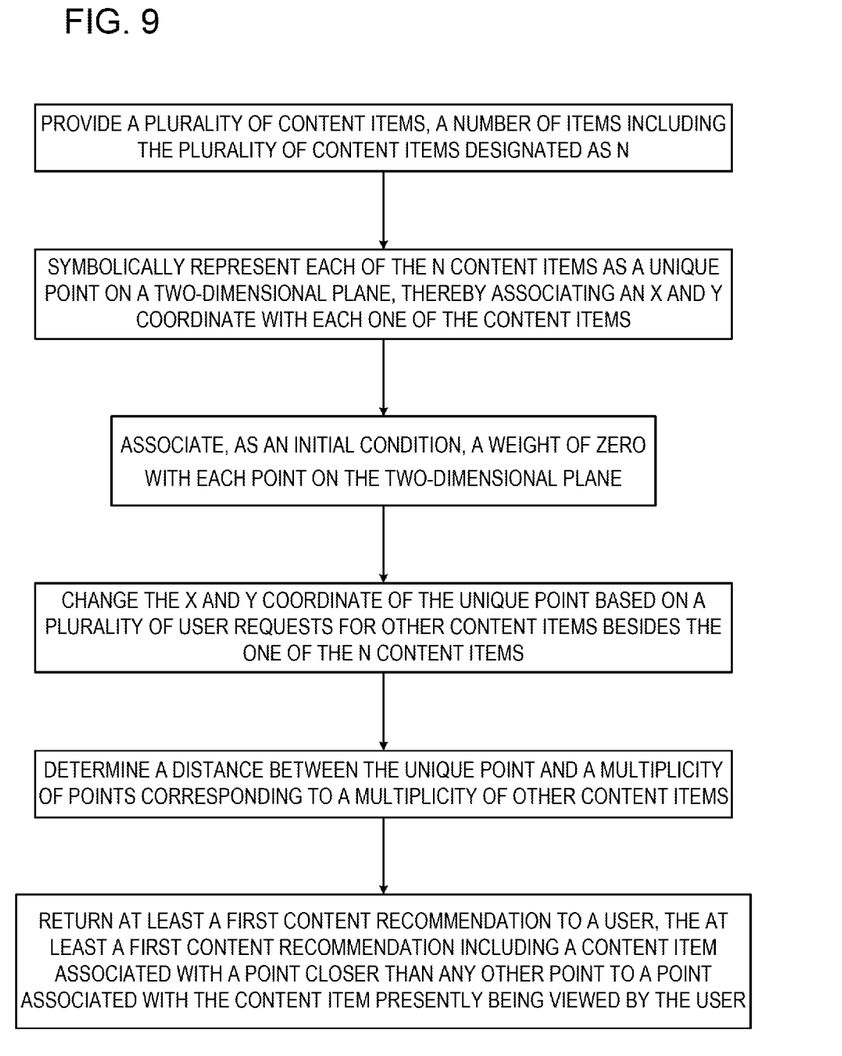

Reference is now made to FIGS. 8 and 9, which are simplified flowcharts of certain methods of operation of the system of FIG. 1. FIGS. 8 and 9 are believed to be self-explanatory in light of the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product; on a tangible medium; or as a signal interpretable by an appropriate computer.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A content recommendation method comprising:
providing a plurality of content items as part of a content catalog to a plurality of users, a number of items comprising the plurality of content items designated as N;
symbolically representing each of the N content items as a point on a two-dimensional plane, in a processor of a ranking server, where each one of the N content items is associated with a pair of x and y coordinates that initially have random values;
automatically updating the values of the x and y coordinates of a first point on the two-dimensional plane whenever one of the plurality of users requests the content item associated with the first point, and where the updating is based on the last content item requested before the content item associated with the first point;
automatically determining respective distances between the first point and each of a multiplicity of points on the two-dimensional plane, where each of the multiplicity of points is associated, respectively, with another one of the N content items;
returning an at least first content recommendation to an information server, the at least first content recommendation identifying a recommended content item, from among the N content items; where a present point on the two-dimensional plane is associated with a content item, from among the N content items, that is presently viewed by a user, where the recommended content item is associated with a recommended point on the two-dimensional plane, and where a distance between the present point and the recommended point is less than a distance between the present point and any other point associated with one of the N content items;
providing the first content recommendation to the user's set top box from the information server; and
upon selection of a second one of the N content items by the user:
calculating new x and y coordinates for the present point associated with the content item that was viewed by the user immediately prior to the selection of the second one of the N content items;
calculating new x and y coordinates for a second point associated with the second one of the N content items selected by the user; and
calculating a distance between the new x and y coordinates of the second point and the new x and y coordinates for the present associated with the content item that was being viewed by the user immediately prior to selection of the second content item.

2. A content recommendation method comprising:
performing the method of claim 1 independently for each one of a plurality of given defined group of users; wherein the updating step is performed for a particular one of the defined groups only when a member of the particular one defined group accesses one of the N content items; and wherein the calculating steps are performed for the particular one of the defined groups to which the user belongs when the user selects the second one of the N content items.

* * * * *

UNITED STATES PATENT AND TRADEMARK OFFICE
CERTIFICATE OF CORRECTION

| | | |
|---|---|---|
| PATENT NO. | : 9,147,012 B2 | Page 1 of 1 |
| APPLICATION NO. | : 13/503479 | |
| DATED | : September 29, 2015 | |
| INVENTOR(S) | : Nicolas Gaude | |

It is certified that error appears in the above-identified patent and that said Letters Patent is hereby corrected as shown below:

In the Specification

In column 7, line 48, delete "resealing" and substitute therefor --rescaling--.

In the Claims

In column 14, line 21 (46th line of claim 1), delete "present associated" and substitute therefor --present point associated--.

Signed and Sealed this
Twenty-ninth Day of March, 2016

Michelle K. Lee
*Director of the United States Patent and Trademark Office*